(12) United States Patent
Forssell et al.

(10) Patent No.: US 6,665,280 B2
(45) Date of Patent: Dec. 16, 2003

(54) METHOD AND APPARATUS PROVIDING MULTIPLE TEMPORARY BLOCK FLOW (TBF) MAPPING TO UPPER LAYER WHEN OPERATING IN GSM/EDGE RADIO ACCESS NETWORK (GERAN) A/GB MODE

(75) Inventors: Mika Kristian Forssell, Espoo (FI); Janne Juhani Parantainen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/104,847

(22) Filed: Mar. 22, 2002

(65) Prior Publication Data

US 2003/0179726 A1 Sep. 25, 2003

(51) Int. Cl.[7] ................................................ H04Q 7/00
(52) U.S. Cl. ........................ 370/329; 370/389; 370/401; 370/468; 455/450
(58) Field of Search ................................. 370/324, 328, 370/329, 330, 338, 349–352, 401–468, 337, 535, 389; 455/450, 452, 466, 445

(56) References Cited

U.S. PATENT DOCUMENTS

| | | | |
|---|---|---|---|
| 5,784,362 A | 7/1998 | Turina | 370/321 |
| 6,031,832 A | 2/2000 | Turina | 370/348 |
| 6,356,759 B1 | 3/2002 | Mustajarvi | 455/450 |
| 6,438,114 B1 | 8/2002 | Womack et al. | 370/329 |
| 6,466,568 B1 | 10/2002 | Raith et al. | 370/347 |
| 2002/0034949 A1 * | 3/2002 | Hoff et al. | 455/445 |
| 2002/0038614 A1 * | 4/2002 | Momose | 370/352 |
| 2002/0041583 A1 * | 4/2002 | Lintulampi et al. | 370/337 |
| 2002/0045458 A1 * | 4/2002 | Parantainen et al. | 455/466 |
| 2002/0065081 A1 * | 5/2002 | Barany et al. | 455/450 |
| 2002/0181422 A1 * | 12/2002 | Parantainen et al. | 370/337 |

OTHER PUBLICATIONS

3GPP TS 43.051; vol. 5.2.0 Jun. 2001; pp. 2.
3GPP TS 44.060; vol. 4.3.0; Sep. 2001; pp. 18–20, 60–63, 66–67.

* cited by examiner

Primary Examiner—Chi Pham
Assistant Examiner—Afsar M. Qureshi
(74) Attorney, Agent, or Firm—Harrington & Smith, LLP

(57) ABSTRACT

Disclosed is a wireless communications system, in the preferred embodiment a GSM/EDGE Radio Access Network system, that includes a Logical Link Control layer of a mobile station and a Logical Link Control layer of a Serving General Packet Radio Service Support Node that are coupled together through a Gb interface. The system operates for establishing and operating a plurality of Temporary Block Flows for transferring Packet Data Units in either an uplink or a downlink direction between the Logical Link Control layer of the mobile station and the Logical Link Control layer of the Serving General Packet Radio Service Support Node. The system operates at a level of the Logical Link Control layer and a Radio Link Control layer for distinguishing Packet Data Units belonging to a first Temporary Block Flow from Packet Data Units belonging to a second Temporary Block Flow based on information associated with each Packet Data Unit, and maps the Packet Data Units into the appropriate one of the first Temporary Block Flow or the second Temporary Block Flow based on the information. A method for operating the system is also disclosed.

39 Claims, 4 Drawing Sheets

METHOD AND APPARATUS PROVIDING MULTIPLE TEMPORARY BLOCK FLOW (TBF) MAPPING TO UPPER LAYER WHEN OPERATING IN GSM/EDGE RADIO ACCESS NETWORK (GERAN) A/GB MODE

TECHNICAL FIELD

These teachings relate generally to digital cellular telecommunications systems, protocols and layers and, more specifically, to the evolving third generation (3G) digital cellular systems providing packet data flows between mobile stations and the wireless network.

BACKGROUND

The following abbreviations are herewith defined.

| | |
|---|---|
| 3G | Third Generation (cellular system) |
| A | Interface between the BSS and MSC (GSM specific) |
| A/Gb mode | Mode of operation of MS when connected to the Core Network via GERAN and the A and/or Gb interfaces |
| BSS | Base Station System |
| BSSGP | BSS GPRS Protocol |
| BTS | Base Transceiver Station |
| CN | Core Network |
| CS | Circuit Switched |
| DL | Downlink (to the MS) |
| EDGE | Enhanced Data rate for Global Evolution |
| EGPRS | Enhanced General Packet Radio Service |
| Gb | Interface between the GERAN and SGSN (GPRS specific) |
| GERAN | GSM/EDGE Radio Access Network |
| GPRS | General Packet Radio Service |
| GMM | GPRS Mobility Management |
| GSM | Global System for Mobile Communications |
| IP | Internet Protocol |
| Iu mode | Mode of operation of MS when connected to the core network via GERAN or UTRAN and the Iu interface |
| Iur | A logical interface between two RNC |
| LLC | Logical Link Control |
| MAC | Medium Access Control |
| MM | Mobility Management |
| MS | Mobile Station |
| MSC | Mobile Switching Center |
| PDCP | Packet Data Convergence Protocol |
| PDP | Packet Data Protocol |
| PDU | Packet Data Unit |
| PFC | Packet Flow Context |
| PHY | Physical Layer |
| PS | Packet Switched |
| QoS | Quality of Service |
| RAB | Radio Access Bearer |
| RAN | Radio Access Network |
| RLC | Radio Link Control |
| RNC | Radio Network Controller |
| SAPI | Service Access Point Identifier |
| SGSN | Serving GPRS Support Node |
| SMS | Short Message Service |
| TBF | Temporary Block Flow |
| UL | Uplink (from the MS) |
| UTRAN | Universal Terrestrial Radio Access Network |

Reference can also be made to 3GPP TR21.905, V4.4.0 (2001-10), Third Generation Partnership Project; Technical Specification Group Services and System Aspects; Vocabulary for 3GPP Specifications (Release 4).

In GPRS the RLC/MAC layer link between the MS and the network is called a Temporary Block Flow (TBF). In the first releases of GPRS and EGPRS only one TBF could be allocated for a MS. As a result all of the data targeted to a given MS must be sent through the same TBF. At least one disadvantage of this approach is that different applications that can be concurrently running in the MS, and that must share the same TBF, can interfere each other, thereby degrading the expected QoS.

Also, the single TBF may transfer data only in one RLC mode, i.e., in Acknowledge (ACK) mode or unacknowledge (UNACK) mode.

Furthermore, in the case where the RLC mode changes between two consecutive LLC PDUs (PDCP PDUs), the existing TBF has to be released and a new TBF has to be established in the different RLC mode. As can be appreciated, the need to release and then re-establish the TBF can result in user-perceivable and objectionable delays in user data transmission.

It has been proposed to provide a capability to allocate a plurality of TBFs per each MS. The assumption has been, thus far, that the multiple TBF functionality is possible in the Iu mode, as the TBFs can be mapped on Radio Bearers (RBs) and further Radio Access Bearers (RABs) in the CN side (via the Iu interface). Recently some interest has been expressed in providing the multiple TBF functionality as well when the MS is operating in the traditional A/Gb mode. However, in this case the TBF mapping is required to be done in a different way, as significant differences exist between the Iu and the A/Gb interfaces.

As such, the inventors have realized that a need has arisen to provide a mapping mechanism for multiple TBFs between the RLC/MAC layer and the higher layers, when operating in the GERAN A/Gb mode. This need was not fulfilled prior to this invention.

SUMMARY OF THE PREFERRED EMBODIMENTS

The foregoing and other problems are overcome, and other advantages are realized, in accordance with the presently preferred embodiments of these teachings.

The mapping described herein is beneficially used for the case where it is desired to provide a plurality of TBFs in one direction with one MS operating in the GERAN A/Gb mode.

A method is disclosed for transferring data between a mobile station and a wireless communications network. The method includes generating a plurality of data packets and sending at least one data packet through a first Temporary Block Flow and at least one other data packet through a second Temporary Block Flow, where the first Temporary Block Flow is distinguished from the second Temporary Block Flow by information sent in or with the data packets. When multiple TBFs exist, the first is created and the next one or more TBFs are created using an existing TBF (either an UL or a DL TBF). When transferring data via a TBF, the mobile station and network do not require information regarding the existence of other TBFs, so long as the mobile station and network are able to correctly associate a received packet to the correct TBF based on information received with the packet (e.g., RLC data block).

Also disclosed is a wireless communications system, in the preferred embodiment a GSM/EDGE Radio Access Network system, that includes a Logical Link Control layer of a mobile station and a Logical Link Control layer of a Serving General Packet Radio Service Support Node that are coupled together, where the Serving General Packet Radio Service Support Node and a Base Station System are coupled together through a Gb interface. The system operates for establishing and operating a plurality of Temporary Block Flows for transferring Packet Data Units in either an uplink or a downlink direction between the Logical Link Control layer of the mobile station and the Logical Link Control layer of the Serving General Packet Radio Service Support Node. At any given time there may exist only UL TBF(s), only DL TBF(s), or a combination of UL and DL TBFs.

The system operates at a level of the Logical Link Control layer and a Radio Link Control layer for distinguishing Packet Data Units belonging to a first Temporary Block Flow from Packet Data Units belonging to a second Temporary Block Flow based on information associated with each Packet Data Unit, and maps the Packet Data Units into the appropriate one of the first Temporary Block Flow or the second Temporary Block Flow based on the information. In various embodiments the information is contained in a Packet Data Unit header, or it is derived from information sent with the Packet Data Unit. The information can include Service Access Point Identifier information carried in an address field of each Logical Link Control frame, or the information can include Quality of Service information. The information may be Packet Flow Context information that reflects specific Quality of Service values. The information may also be embodied as Radio Link Control Acknowledge mode information and Radio Link Control Un-Acknowledge mode information. In a further embodiment the information can include Flow Identifier information that is inserted into each Packet Data Unit.

Also encompassed by the teachings of this invention is the case where a tunnel is established between the Serving General Packet Radio Service Support Node and the Base Station System, and all data sent via the tunnel is relayed to one TBF.

In each direction there are from zero to N TBFs. When zero TBFs exist, then one must establish the first TBF in the desired direction when it is needed. The teachings of this invention provide a mechanism for defining, based on certain information, if a new TBF is required, or if an existing TBF can be used to transfer a given LLC PDU.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
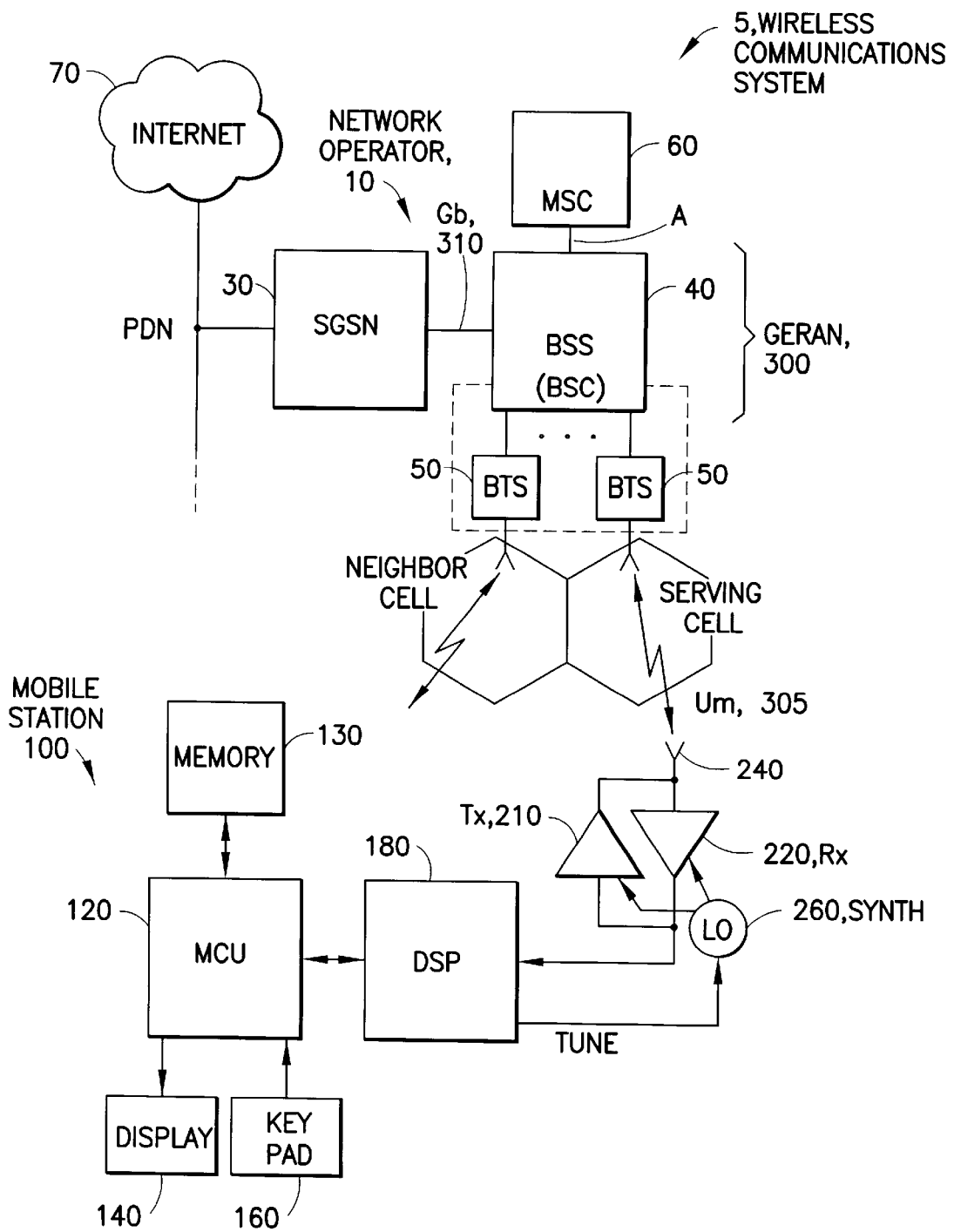
FIG. 1 is a simplified block diagram of an embodiment of a wireless communications system 5 that is suitable for practicing this invention.

Referring first to FIG. 1, there is illustrated a simplified block diagram of an embodiment of a wireless communications system 5 that is suitable for practicing this invention. The wireless communications system 5 includes at least one mobile station (MS) 100. FIG. 1 also shows an exemplary network operator having, for example, a Serving GPRS Support Node (SGSN) 30 for connecting to a telecommunications network, such as a Public Packet Data Network or PDN, at least one base station system (BSS) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. Note that in practice the BTSs 50 actually form a part of the BSS 40. They are shown as separate elements in FIG. 1 simply for convenience.

The air interface standard can conform to any suitable standard or protocol, and may enable both voice and data traffic, such as data traffic enabling Internet 70 access and web page downloads. In the presently preferred embodiment of this invention the air interface standard is a Time Division Multiple Access (TDMA) air interface that supports a GSM or an advanced GSM protocol and air interface, although these teachings are not intended to be limited to TDMA or to GSM or GSM-related wireless systems. The network operator 10 is assumed to also include a Mobile Switching Center (MSC) 60.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocol stacks, depicted in FIG. 2, that are required to operate with software routines, layers and protocol stacks in the network 10, more specifically the GERAN 300, so as to implement the methods in accordance with this invention. The ROM also includes software for providing overall control over the MS 100, as well as to provide a suitable user interface, via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260 included in a frequency synthesizer is provided for tuning the transceiver. Data, such as digitized voice and packet data, is transmitted and received through the antenna 240.

At the outset it should be noted that the teachings of this invention are related to several GERAN 300 standards. In general, these teachings affect the following protocol/layers, where the current version of the GERAN standards that pertain to each of these protocols and layers is given in parenthesis simply as a point of reference: RLC/MAC (3GPP TS 44.060), BSSGP (3GPP TS 48.018) and LLC (3GPP TS 04.64). It can be appreciated that the teachings in accordance with this invention go beyond what is currently found in the existing GERAN standards and systems.

It is further noted that the teachings of this invention are directed most particularly towards the packet switched (PS) domain (via the Gb interface), in particular to the mapping of TBFs relative to the upper layers, and not towards the circuit switched (CS) domain. The reference to the circuit switched A interface is made herein simply because the MS 100 is traditionally said to be in the A/GB mode (the CN interface is A and/or Gb) or in the Iu mode (the CN interface is Iu). Note that, for example, in the Dual Transfer Mode the MS 100 could simultaneously have a CS connection to the MSC 60 via the A interface, and a PS connection to the SGSN 30 via the Gb interface 310, while in the Iu mode the MS 100 can simultaneously have a CS connection and a PS connection, both via the Iu interface.

Figure 2:
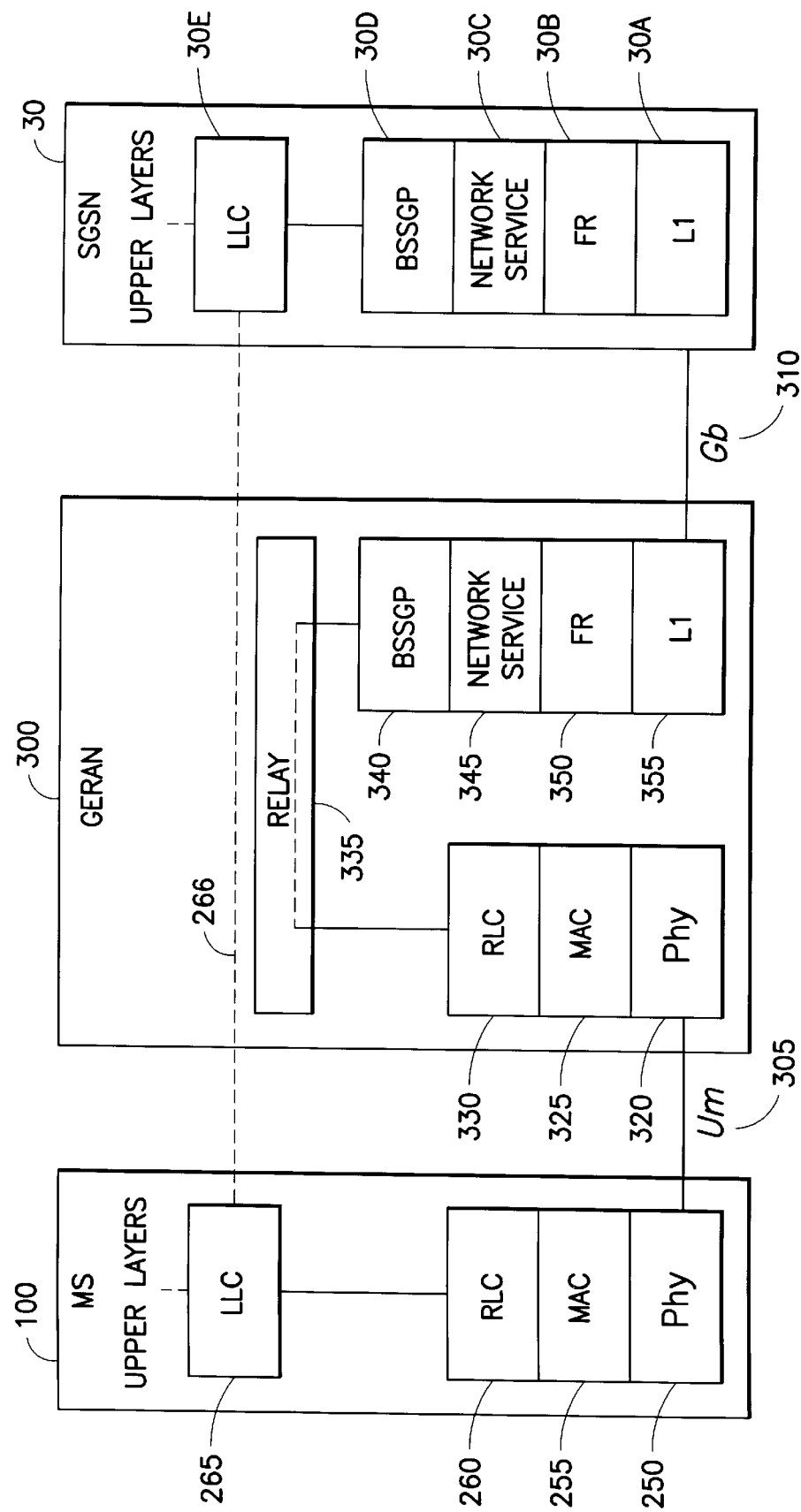
FIG. 2 illustrates the protocol stacks from the MS to the CN via the BSS and Gb interface.

In order to gain a full understanding of the benefits provided by this invention, reference is made first to FIG. 2. Fig. shows the MS 100, GERAN 300 and SGSN 30 protocol stacks and their relationship to the Gb interface 310. The MS 100 can be seen to include a PHY layer 250, a MAC layer 255, a RLC layer 260 and a LLC layer 265, as well us upper layers that are not germane to the teachings of this invention, except to note that this invention handles the mapping of upper layer PDUs to TBFs, as is described in greater detail below. The PHY layer 250 is interfaced to a corresponding PHY layer 320 in the GERAN 300 through a Um interface 305. Corresponding to the MAC layer 255 and the RLC layer 260 in the MS 100 is a GERAN 300 MAC layer 325 and RLC layer 330. The RLC layer 330 is coupled through a Relay layer 335 to a BSSGP layer 340, which lies above a Network Services layer 345, a FR layer 350 and Layer 1 (L1) or physical layer 355. The L1 355 is interfaced to a corresponding L1 30A in the Serving GPRS Support Node (SGSN) 30. Above the L1 30A, corresponding to the GERAN 300 layers, is a FR layer 30B, Network Services layer 30C and a BSSGP layer 30D. A SGSN LLC layer 30E is logically coupled to the MS 100 LLC layer 265 (shown as the dashed line 266A). The SGSN 30 may also include additional upper layers, but these are not germane to an understanding of this invention except to note, as above, that this invention handles the mapping of upper layer PDUs to TBFs.

Note that these upper layers can include applications that generate and/or consume data packets. One example would be a web browser application that runs in the MS 100, while another application could be a video application that also runs in the MS 100 and that outputs or inputs video data packets. These applications could be running simultaneously, and could be running with different parameters. For example, the web browser application may be running in a mode where data packet acknowledgments are required, while in the video application they may not be required. This invention provides a technique for mapping the PDUs generated by and/or sent to these applications to TBFs, while operating using the Gb interface 310.

Note as well that in general the application can generate data packets that are routed via a protocol stack to the RLC/MAC. In the RLC/MAC the user data packets that are carried in protocol stack-specific PDUs are mapped into different TBFs based on the characteristics of the upper layer PDUs.

Note that the MS LLC 265 and RLC 260 are located in the same element (i.e., the MS 100). On the network side, however, the RLC/MAC protocol is allowed to be located at the BTS 50, the BSS 40 or the SGSN 30. The network LLC 30E is always, however, located at the site of the SGSN 30 (at least according to the current specifications). Thus, in the network side the LLC 30E and the RLC 330 may be located in the same network element (i.e., the SGSN 30), or they may be located in different network elements (e.g., the RLC 330 in the BSS 40 and the LLC 30E in the SGSN 30.)

In operation, the MS 100 sends data to the network 10 using the Logical Link Control (LLC) protocol 265. While shown as the dashed (logical) connection 266 in FIG. 2, in actuality the MS 100 originated LLC packets are input to the RLC 260, segmented into an appropriate number of RLC/MAC PDUs and sent over the radio channel as uplink (UL) packets via the PHY 250. On the network side the RLC/MAC PDUs are concatenated into LLC PDUs that are relayed to the SGSN 30 using the BSSGP protocol 340 (via the Gb interface 310 between L1 355 and L1 30A), and are then provided to the LLC layer 30E. Downlink (DL) packet data going to the MS 100 takes the opposite route as the UL packets.

In (E)GPRS the user data packets, as well as GPRS Mobility Management (GMM) and LLC signalling, are transferred via the LLC layer 265/30E. In the LLC layer the received packets are mapped into the LLC Service Access Point Identifier (SAPI) according to characteristics of the packets (e.g., based on the QoS). The LLC SAPI can operate in the ACK and/or UNACK LLC mode. The GMM and Short Message Service (SMS) have their own dedicated SAPI and, for user data traffic, currently four SAPIs are defined. The traffic belonging to all of the LLC SAPIs is mapped, however, to the one and only TBF. There is only one RLC entity and flow that can be multiplexed to a logical channel. While several TBFs from different MSs 100 can be multiplexed to a single logical channel, at present there can be only one TBF per MS 100.

In order for more than one TBF to be supported by the MS 100 it can be appreciated that a different mapping mechanism that the one described thus far must be implemented. The new mapping mechanism in accordance with this invention provides for UL data packets from a TBF to be routed (mapped) to the BSSGP layer and further to the LLC layer 30E. The new mechanism also operates for DL data packets to be routed (mapped) from the network LLC 30E to the MS LLC 265.

In accordance with this invention an association is made between LLC PDUs and TBFs based on information received with the LLC PDU. The information is carried with PDU itself (e.g, in the packet header), or the information may be derived from the data flow that carried the LLC PDUs. For example, there may be a specific connection between the LLC 265 and RLC 260 that carries LLC PDUs having specific parameters, such as QoS parameters.

The presently preferred mapping mechanism can be implemented as follows.

Figure 3:
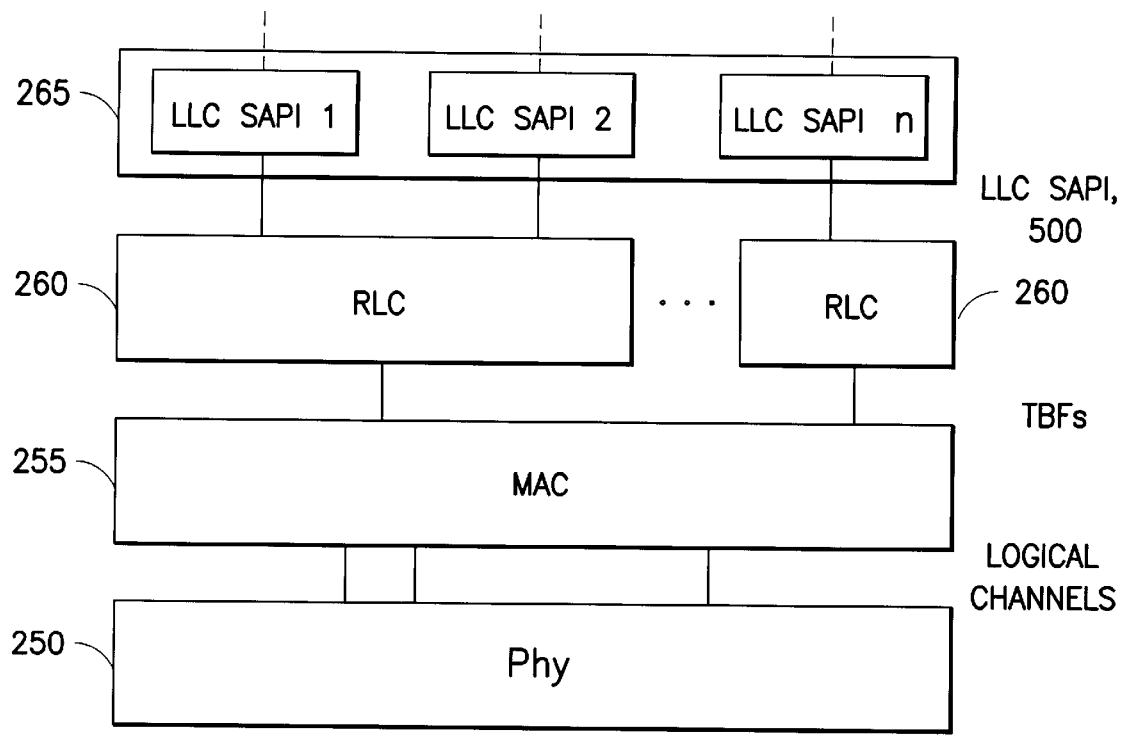
FIG. 3 shows the multiplexing of different LLC SAPIs to and from TBFs.

Referring also to FIG. 3 (for the MS 100 case), in a first embodiment the LLC SAPI 500 is used for mapping a LLC PDU to a TBF. In this case the RLC 260 decodes the SAPI from the LLC PDU header, or the SAPI may be included in a PDU transferring a LLC PDU (e.g., in the network side the SAPI may be included in the BSSGP 340/30D DL-UNITDATA that is transferring the LLC PDU over the Gb interface 310). In the MS 100 the interface between the LLC 265 and the RLC 260 is an internal interface, and thus the SAPI can be implemented in any appropriate way.

In a second embodiment the QoS is used for mapping the LLC PDU to a TBF. Each LLC PDU that is carrying a user data packet is associated to a PDP context, and each PDP context has specific QoS values.

In a third embodiment the Packet Flow Context (PFC) is used for mapping LLC PDUs to a TBF. The PFC reflects specific QoS values, and one or several PDP contexts can be mapped to a PFC.

In a fourth embodiment the system operates to direct LLC PDUs requiring the RLC ACK mode into one TBF, and LLC PDUs requiring the RLC UNACK mode into another TBF. In this approach TBF establishments and releases can be avoided in the case where the RLC mode changes during a transmission.

In a fifth embodiment a new identifier is used for mapping the LLC PDU to a TBF.

On the MS 100 side, and since the interface between the LLC 265 and the RLC 260 is internal the MS 100, the LLC 265 may pass mapping information to the RLC 260 using internal signaling, without requiring a modification to the specifications governing transfer over the air interface.

On the network 10 side, for the case where the RLC 330 is not located in the same network element as the LLC 30E (as is shown in the example of FIG. 2), the BSSGP 340/30D protocol is used to transfer LLC PDUs between the RLC 330 and the LLC 30E. Thus, mapping information may be included in a BSSGP PDU, or the mapping information may be derived based on the data flow carrying the LLC PDUs.

In the case where the RLC 330 is located in the same network element as the LLC 30E, the LLC may pass mapping information to the RLC using internal signaling, without requiring a modification to the specifications that govern transfer over various (external) interfaces.

Figure 4:
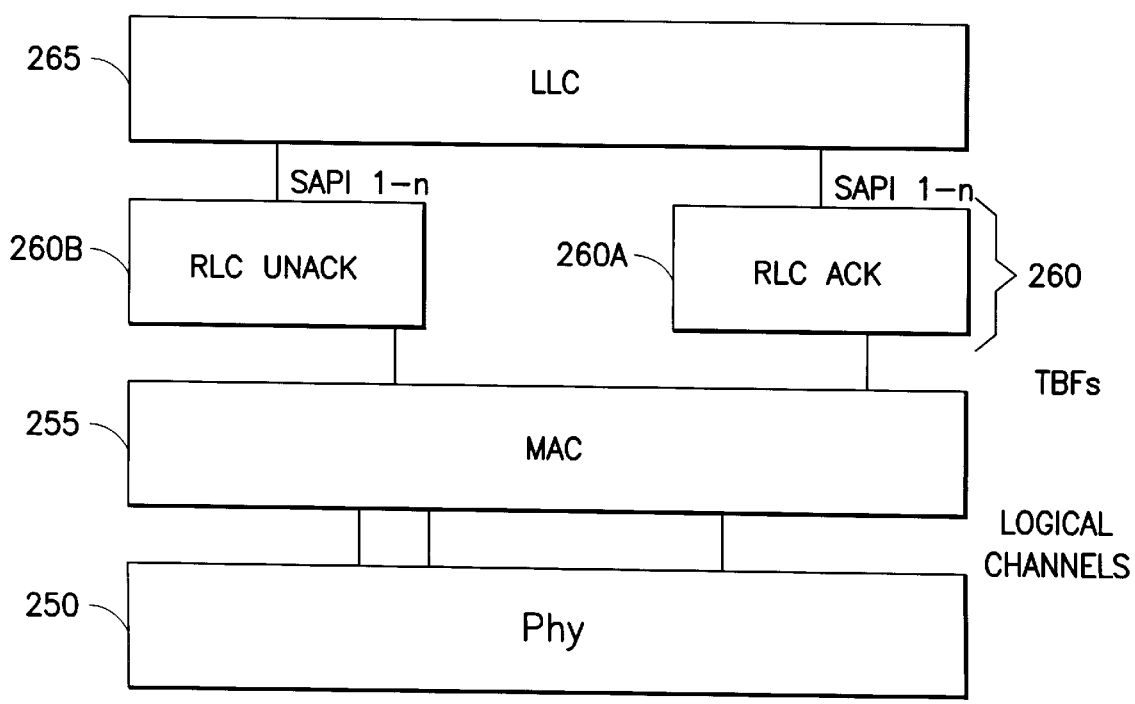
FIG. 4 is a diagram that is useful for understanding RLC mode based mapping.
Figure 5:
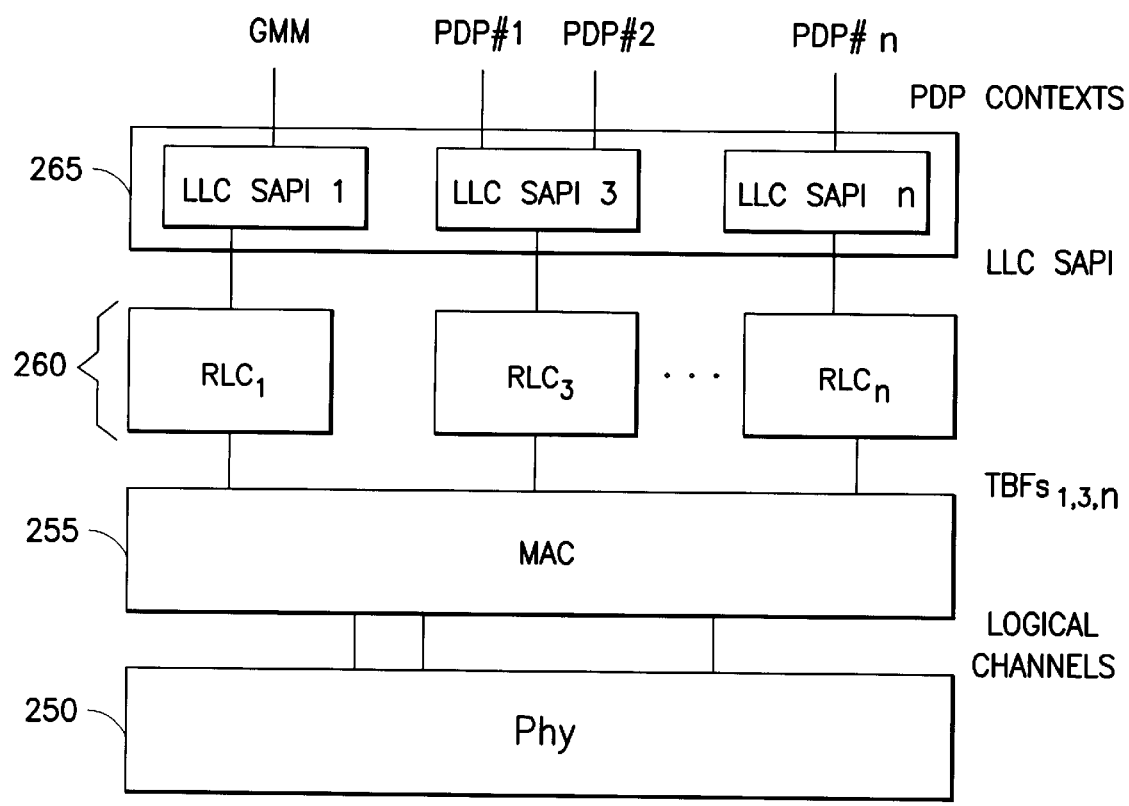
FIG. 5 is a diagram that is useful for understanding PFC/QoS based mapping.

It should be noted in the discussion of FIGS. 3, 4 and 5 that the multiple depicted RLC units 260 are to be understood as being TBFs, and may be implemented as a separate RLC protocol per TBF or as a common RLC protocol containing several TBFs.

It should further be noted that the location of different RLC units on the network side could vary, thereby enabling, for example, a RLC unit carrying delay sensitive traffic to be located in the BTS 50, while a RLC unit that carries "best effort" data can be located in the BSC.

Discussing first the embodiment of LLC SAPI-based mapping, the user data packets, as well as GMM PDUs and SMS messages, are transferred via the LLC layer 265/30E. In the LLC layer there exists several SAPIs 500 identifying a LLC connection. The SAPI is used to identify the service access point on the SGSN 30 side and on the MS 100 side of the LLC interface 266. SAPI is carried in the address field of each LLC frame.

FIG. 3 illustrates how different LLC SAPIs 500 can be multiplexed in the RLC layer 260 into TBFs. The LLC PDUs from one or more LLC SAPIs 500 can be multiplexed into one TBF.

Table 1 shows a current allocation of SAPI values, per 3GPP 44.064.

TABLE I

| SAPI | Related Service | SAP Name |
|---|---|---|
| 0 | Reserved | — |
| 0001 | GPRS Mobility Management | LLGMM |
| 0010 | Tunnelling of messages 2 | TOM2 |

TABLE I-continued

| SAPI | Related Service | SAP Name |
|---|---|---|
| 0011 | User data 3 | LL3 |
| 0100 | Reserved | — |
| 0101 | User data 5 | LL5 |
| 0110 | Reserved | — |
| 0111 | SMS | LLSMS |
| 1000 | Tunnelling of messages 8 | TOM8 |
| 1001 | User data 9 | LL9 |
| 1010 | Reserved | — |
| 1011 | User data 11 | LL11 |
| 1100 | Reserved | — |
| 1101 | Reserved | — |
| 1110 | Reserved | — |
| 1111 | Reserved | — |

With regard to RLC mode based mapping, and referring to FIG. 4, the fourth embodiment listed above is to direct LLC PDUs requiring the RLC ACK mode into one TBF (shown in this case as RLC 260A), and LLC PDUs requiring the RLC UNACK mode into another TBF (shown as the RLC 260B). In this case then there are two TBFs established simultaneously, one carrying the LLC PDUs that require the RLC ACK mode, and the other carrying the LLC PDUs that require the RLC UNACK mode.

With regard to the third embodiment discussed above, i.e., Packet Flow Context/QoS based mapping, and referring to FIG. 5, it is noted that messages being transferred via the LLC layer 265/30E have certain defined characteristics. For example, prior to a user data packet transfer a PDP context is required to be activated. When the PDP context is activated the QoS associated with the PDP context is negotiated between the MS 100 and the network 10. As a result, each user data packet being passed to the LLC layer has certain associated values of priority, throughput, and so forth. In a similar manner the GPRS Mobility Management (GMM) messages being transferred via LLC layer 265/30E have certain specific values, for example, the priority is set to be the highest possible.

As can be seen then in FIG. 5, the characteristics of the messages being transferred via the LLC layer 265/30E are used for mapping LLC PDUs into different types of TBFs based on different PDP contexts. Note that the LLC SAPI 1 corresponds to the LL GMM SAPI value 0001 in Table 1, the LLC SAPI 3 corresponds to the User Data 3 SAPI value 0011. In this case there are established logical $RLC_1$, $RLC_3$, . . . , $RLC_n$ blocks corresponding to $TBF_1$, $TBF_3$, . . . , $TBF_n$, all of which can be simultaneously active and passing packet data to and from the lower layer (in the illustrated case of the MS 100). The RLC 330, LLC 30E on the network side would be logically configured in the same manner.

Note that, depending on the MS 100 implementation, the RLC 260 may be communicating directly with the PHY 250, and the MAC 255 may be responsible for handling the signaling, such as TBF establishment.

In the fifth embodiment mentioned above it was stated that a new identifier based mapping could also be employed. In this case it is within the scope of this invention to create a new identifier, on which the LLC PDUs are mapped to TBFs. For example, LLC PDUs may carry a new flow identifier and each flow/group of flows is mapped to a particular TBF based on the value of the identifier.

This mode of operation is depicted in the following Tables 2 and 3, where Table 2 illustrates a conventional format of a PDU type: DL-UNITDATA, and Table 3 illustrates a format of the DL-UNITDATA in accordance with this fifth embodiment of the invention, wherein the flow identifier (Flow ID) is included. The reference field refers to the appropriate 3GPP specification. The PDU is sent to the BSS 40 from the SGSN 30 to transfer an LLC-PDU across the radio interface to the MS 100.

In an even more general sense this invention provides a mechanism for defining to which TBF an upper layer-related PDU belongs.

While described herein in the context a number of embodiments and examples of this invention, those skilled

TABLE 2

DL-UNITDATA PDU contents

| Information element | Type/Reference | Presence | Format | Length |
|---|---|---|---|---|
| PDU type | PDU type/11.3.26 | M | V | 1 |
| TLLI (current) | TLLI/11.3.35 | M | V | 4 |
| QoS Profile | QoS Profile/11.3.28 | M | V | 3 |
| PDU Lifetime | PDU Lifetime/11.3.25 | M | TLV | 4 |
| MS Radio Access Capability a) | MS Radio Access Capability/11.3.22 | O | TLV | 7–? |
| Priority | Priority/11.3.27 | O | TLV | 3 |
| DRX Parameters | DRX Parameters/11.3.11 | O | TLV | 4 |
| IMSI | IMSI/11.3.14 | O | TLV | 5–10 |
| TLLI (old) | TLLI/11.3.35 | O | TLV | 6 |
| PFI | PFI/1.3.42 | O | TLV | 3 |
| LSA Information | LSA Information/11.3.19 | O | TLV | 7–? |
| Service UTRAN CCO | Service UTRAN CCO/11.3.47. | O | TLV | 3 |
| Alignment octets | Alignment octets/11.3.1 | O | TLV | 2–5 |
| LLC-PDU | LLC-PDU/11.3.15 | M | TLV | 3–? |

TABLE 3

New DL-UNITDATA PDU contents

| Information element | Type/Reference | Presence | Format | Length |
|---|---|---|---|---|
| PDU type | PDU type/11.326 | M | V | 1 |
| TLLI (current) | TLLI/11.3.35 | M | V | 4 |
| QoS Profile | QoS Profile/11.3.28 | M | V | 3 |
| PDU Lifetime | PDU Lifetime/11.3.25 | M | TLV | 4 |
| MS Radio Access Capability a) | MS Radio Access Capability/11.3.22 | O | TLV | 7–? |
| Priority | Priority/11.3.27 | O | TLV | 3 |
| DRX Parameters | DRX Parameters/11.3.11 | O | TLV | 4 |
| IMSI | IMSI/11.3.14 | O | TLV | 5–10 |
| TLLI (old) | TLLI/11.3.35 | O | TLV | 6 |
| PFI | PF/11.3.42 | O | TLV | 3 |
| LSA Information | LSA Information/11.3.19 | O | TLV | 7–? |
| Service UTRAN CCO | Service UTRAN CCO/11.3.47. | O | TLV | 3 |
| Alignment octets | Alignment octets/11.3.1 | O | TLV | 2–5 |
| LLC-PDU | LLC-PDU/11.3.15 | M | TLV | 3–? |
| Flow ID | Flow ID/x.y.z | O | TV | 2 |

Based on the foregoing description it can be appreciated that this invention provides a technique to define TBFs between a RLC/MAC transmitter and a RLC/MAC receiver, and teaches how to map LLC PDUs into different TBFs. Once a TBF has been created, the specific TBF identifier, referred to herein as the Temporary Flow Identifier, identifies a TBF. Thus, when RLC data blocks are being transferred, the receiver is able to associate the received RLC data block to a TBF based on the TFI.

When, for example, a RLC ACK TBF is created and a RLC UNACK TBF is also created, the RLC data blocks being transferred via these two TBFs do not carry the ACK/UNACK information. Instead, the TFI identifying a TBF distinguishes the TBFs, and the handling of the received RLC data block depends on the parameters negotiated for the TBFs. If a RLC data block is received and the TFI associated with the data block specifies the RLC ACK TBF, then ACK mode operations are performed. Note that, in accordance with conventional practice, the ACK/UNACK information is not (as currently specified) transferred with every message associated with the TBF. Instead, the ACK/UNACK status is negotiated when the TBF is first established.

in the art should appreciate that changes and form and details can be made to these embodiments and examples, and that these modifications will still fall within the scope of this invention. For example, one or more of the reserved SAPI values can be defined, in addition to those already defined in Table 1, and multiple TBFs established based on the newly-defined SAPI values for the case of the first embodiment discussed above. In this manner one may create more than the present four TBF classes for user data traffic.

What is claimed is:

1. A method for transferring data between a mobile station and a wireless communications network, comprising:
    generating a plurality of data packets; and
    sending at least one data packet through a first Temporary Block Flow and at least one other data packet through a second Temporary Block Flow; where
    a decision as to which Temporary Block Flow to use for a given packet is made based on information associated with upper layer packet data units (PDUs).

2. A method as in claim 1, where the information is contained in a data packet header.

3. A method as in claim 1, where the information is derived from information sent with the data packets.

4. A method as in claim 1, where the information comprises Quality of Service information.

5. A method as in claim 1, where the information comprises Packet Flow Context information.

6. A method as in claim 1, where the information comprises Radio Link Control Acknowledge and Radio Link Control Un-Acknowledge information.

7. A method as in claim 1, where the information comprises Flow Identifier information.

8. A method as in claim 1, where the data packets are sent through an interface with a Serving General Packet Radio Service Support Node.

9. A method as in claim 8, where the data packets are sent through the interface via a Base Station System General Packet Radio Service Protocol.

10. A method for transferring data between a mobile station and a wireless communications network, comprising:
   generating a plurality of data packets; and
   sending at least one data packet through a first Temporary Block Flow and at least one other data packet through a second Temporary Block Flow; where
   a decision as to which Temporary Block Flow to use for a given packet is made based on information associated with upper layer packet data units (PDUs), where the information comprises Logical Link Control Service Access Point Identifier information.

11. In a GSM/EDGE Radio Access Network, a method for operating a plurality of Temporary Block Flows for transferring Packet Data Units between a Logical Link Control layer of a mobile station and a Logical Link Control layer of a Serving General Packet Radio Service Support Node through a Gb interface, comprising:
   at a level of the Logical Link Control layer and a Radio Link Control layer, distinguishing Packet Data Units belonging to a first Temporary Block Flow and Packet Data Units belonging to a second Temporary Block Flow based on information associated with each Packet Data Unit; and
   mapping the Packet Data Units into the appropriate one of the first Temporary Block Flow or the second Temporary Block Flow based on the information.

12. A method as in claim 11, where the information is contained in a Packet Data Unit header.

13. A method as in claim 11, where the information is derived from information sent with the Packet Data Unit.

14. A method as in claim 11, where the information comprises Quality of Service information.

15. A method as in claim 11, where the information comprises Packet Flow Context information reflecting specific Quality of Service values.

16. A method as in claim 11, where the information comprises Radio Link Control Acknowledge mode information and Radio Link Control Un-Acknowledge mode information.

17. A method as in claim 11, where the information comprises Flow Identifier information that is inserted into each Packet Data Unit.

18. In a GSM/EDGE Radio Access Network, a method to operate a plurality of Temporary Block Flows for transferring Packet Data Units between a Logical Link Control layer of a mobile station and a Logical Link Control layer of a Serving General Packet Radio Service Support Node through a Gb interface, comprising:
   at a level of the Logical Link Control layer and a Radio Link Control layer, distinguishing Packet Data Units belonging to a first Temporary Block Flow and Packet Data Units belonging to a second Temporary Block Flow based on information associated with each Packet Data Unit; and
   mapping the Packet Data Units into the appropriate one of the first Temporary Block Flow or the second Temporary Block Flow based on the information, where the information comprises Service Access Point Identifier information carried in an address field of each Logical Link Control frame.

19. A wireless communications system comprising a Logical Link Control layer of a mobile station and a Logical Link Control layer of a Serving General Packet Radio Service Support Node that are coupled together through a Gb interface, further comprising means for establishing and operating a plurality of Temporary Block Flows for transferring Packet Data Units in either an uplink or a down link direction between the Logical Link Control layer of the mobile station and the Logical Link Control layer of the Serving General Packet Radio Service Support Node, said means operating at a level of the Logical Link Control layer and a Radio Link Control layer for distinguishing Packet Data Units belonging to a first Temporary Block Flow from Packet Data Units belonging to a second Temporary Block Flow based on information associated with each Packet Data Unit and for mapping the Packet Data Units into the appropriate one of the first Temporary Block Flow or the second Temporary Block Flow based on the information.

20. A wireless communications system as in claim 19, where said wireless communications system comprises a GSM/EDGE Radio Access Network.

21. A wireless communications system as in claim 19, where the information is contained in a Packet Data Unit header.

22. A wireless communications system as in claim 19, where the information is derived from information sent with the Packet Data Unit.

23. A wireless communications system as in claim 19, where the information comprises Quality of Service information.

24. A wireless communications system as in claim 19, where the information comprises Packet Flow Context information reflecting specific Quality of Service values.

25. A wireless communications system as in claim 19, where the information comprises Radio Link Control Acknowledge mode information and Radio Link Control Un-Acknowledge mode information.

26. A wireless communications system as in claim 19, where the information comprises Flow Identifier information that is inserted into each Packet Data Unit.

27. A wireless communications system as in claim 19, where there are a plurality of Radio Link Control units at least two of which are located in different network elements.

28. A wireless communications system as in claim 27, where said at least two of said plurality of Radio Link Control units operate on different types of Packet Data Units.

29. A wireless communications system comprising a Logical Link Control layer of a mobile station and a Logical Link Control layer of a Serving General Packet Radio Service Support Node that are coupled together through a Gb interface, further comprising means for establishing and operating a plurality of Temporary Block Flows for transferring Packet Data Units in either an uplink or a down link direction between the Logical Link Control layer of the mobile station and the Logical Link Control layer of the Serving General Packet Radio Service Support Node, said means operating at a level of the Logical Link Control layer and a Radio Link Control layer for distinguishing Packet Data Units belonging to a first Temporary Block Flow from Packet Data Units belonging to a second Temporary Block Flow based on information associated with each Packet Data Unit and for mapping the Packet Data Units into the appropriate one of the first Temporary Block Flow or the second Temporary Block Flow based on the information, where the information comprises Service Access Point Identifier information carried in an address field of each Logical Link Control frame.

30. A method to operate a digital wireless communications system that can use at least one Temporary Block Flow (TBF) for transferring Packet Data Units (PDUs) between upper level protocols of a mobile station and a wireless communications system node, comprising:

distinguishing, in an upper protocol layer, PDUs belonging to a first TBF and PDUs belonging to a second TBF based on information associated with each PDU; and directing upper protocol layer PDUs into an appropriate one of the first and second TBFs based on the information associated with each PDU.

31. A method as in claim 30, where said upper protocol layer comprises a Logical Link Control layer of the mobile station.

32. A method as in claim 30, where said upper protocol layer comprises a Logical Link Control layer of the wireless communications system node.

33. A method as in claim 30, where said upper protocol layer comprises a Packet Data Convergence Protocol layer of the mobile station.

34. A method as in claim 30, where said upper protocol layer comprises a Packet Data Convergence Protocol layer of the wireless communications system node.

35. A digital wireless communications system adapted to use at least one Temporary Block Flow (TBF) for transferring Packet Data Units (PDUs) between upper level protocols of a mobile station and a wireless communications system node, comprising means disposed in an upper protocol layer for distinguishing PDUs belonging to a first TBF and PDUs belonging to a second TBF using information associated with each PDU, and for directing upper protocol layer PDUs into an appropriate one of the first and second TBFs based on the information associated with each PDU.

36. A system as in claim 35, where said upper protocol layer comprises a Logical Link Control layer of the mobile station.

37. A system as in claim 35, where said upper protocol layer comprises a Logical Link Control layer of the wireless communications system node.

38. A system as in claim 35, where said upper protocol layer comprises a Packet Data Convergence Protocol layer of the mobile station.

39. A system as in claim 35, where said upper protocol layer comprises a Packet Data Convergence Protocol layer of the wireless communications system node.

* * * * *